//106. COMPOSITIONS,
COATING OR PLASTIC.
90

223,735

UNITED STATES PATENT OFFICE.

WILLIAM H. HOOPES, OF BALTIMORE, MARYLAND.

MANUFACTURE OF ARTIFICIAL STONE OR MARBLE.

SPECIFICATION forming part of Letters Patent No. 223,735, dated January 20, 1880.

Application filed December 30, 1879.

*To all whom it may concern:*

Be it known that I, WILLIAM H. HOOPES, of Baltimore city, State of Maryland, have invented certain new and useful Improvements in the Manufacture of Artificial Stone or Marble; and I hereby declare the same to be fully, clearly, and exactly described as follows:

My invention has for its object to produce an article of artificial stone which shall possess great strength, hardness, and durability, and be susceptible of receiving a high polish.

In carrying out my invention I proceed as follows: To a solution of about five pounds of pearlash in one hundred gallons of water I add about two quarts of a composition consisting of silica, such as sand or other form, seventy-nine parts; water, thirteen parts; ferric oxide, three parts; alumina in the form of clay, kaolin, or the like, four parts, and magnesia one part, which composition, after being formed, is calcined and ground fine. To the solution I next add three pounds of tungstate of soda, and after thoroughly mixing the same I add a mixture of tartaric acid, twenty-five drams; bicarbonate of soda, six troy ounces; tartrate of potassium and sodium, twelve troy ounces.

The basis of the stone consists of Portland, Rosendale, or other cement and silica in any desired proportions—about ten of silica to one of cement answering for all ordinary purposes—and to it is added the solution prepared as above described until the mass has the desired consistency, which will vary according to the intended manner of using the cement.

In making an imitation marble I take gypsum instead of cement, and coloring-matters may be added to produce an artificial stone of any desired tint.

In order to produce the effect of veins, I immerse hair in the coloring-matter and spread the hair so colored on the surface upon which the slab of stone is to be formed. A layer of the stone composition being spread on the colored fibers, the latter are drawn up through it, when they part with their coloring-matter to the composition and produce the appearance of veins in natural stone.

Instead of forming the stone from readymade cement, as described, I may combine selenite, rotten-stone, chalk, or other common ingredient of cement with fine sand or other form of silica, and mix them, when properly comminuted, with the ingredients hereinbefore named. Water is added to the whole until it is about as thin as milk of lime, when the matters in suspension are allowed to settle, and, being drawn off, constitute a most excellent body for paint. To prepare it for making stone this sediment is subjected in any convenient form of apparatus to a red heat. When cool it is sifted through a fine wire-gauze sieve, the finer portions being used for outside work, the coarser for backing up or for the interior of stones. For these purposes it is mixed with water in the proportions of four quarts of sediment to fifty gallons of water, and the mixture is used to properly dampen a composition of one part of cement to five parts of pure sand. The mass is tamped or pressed, as usual, in suitable molds, when it forms a cheap, hard, and durable stone.

Instead of making the material into massive stones, it may be thinned so as to admit of its being applied with a trowel to walls, floors, &c., or it may be even thinned to an extent admitting of its being applied with a brush as an ordinary paint. In either case, when dry it constitutes a hard, durable, water-proof finish, not liable to crack or peel off, and resisting the disintegrating effects of changes of temperature and weather in a remarkable manner.

What I claim is—

1. The composition herein described, consisting of cement, gypsum, or analogous material as a base, combined with silica, ferric oxide, alumina, magnesia, pearlash, tungstate of soda, tartaric acid, bicarbonate of soda, tartrate of sodium and potassium, and water, as set forth.

2. The hardening or solidifying composition for making artificial stone or marble herein described, consisting of silica, ferric oxide, alumina, magnesia, pearlash, tungstate of soda, tartaric acid, bicarbonate of soda, tartrate of sodium and potassium, and water, as described.

3. The process of veining artificial marble or stone, as set forth, consisting in drawing through it, while in the plastic state, hairs carrying a coloring material, as set forth.

WILLIAM HAINES HOOPES.

Witnesses:
FREDERIC C. FUGLE,
GEORGE E. BAUGHMAN.